United States Patent [19]

Smart

[11] Patent Number: 4,893,141
[45] Date of Patent: Jan. 9, 1990

[54] OPEN FRAME SIGHT VIEWFINDER

[75] Inventor: David C. Smart, Rochester, N.Y.

[73] Assignee: Eastman Kodak Company, Rochester, N.Y.

[21] Appl. No.: 303,613

[22] Filed: Jan. 30, 1989

[51] Int. Cl.[4] ............................................. G03B 13/04
[52] U.S. Cl. ....................................... 354/219; 33/266
[58] Field of Search .......................... 354/219; 33/266; 352/95

[56] References Cited

U.S. PATENT DOCUMENTS

| | | |
|---|---|---|
| 783,665 | 2/1905 | Avril ................................. 33/266 |
| 1,411,689 | 4/1922 | Frederick et al. ................ 352/95 |
| 1,423,809 | 7/1922 | Marks ................................ 33/266 |
| 2,005,366 | 6/1935 | Gaty ................................. 354/95 |
| 2,098,873 | 8/1936 | Kuppenbender et al. ........ 352/95 |
| 2,472,823 | 6/1949 | Harlow ............................ 354/217 |
| 2,557,297 | 9/1946 | Lea ................................... 33/266 |
| 2,624,229 | 1/1953 | Feal .................................. 33/266 |
| 2,711,023 | 6/1955 | Nerwin .............................. 33/266 |
| 2,806,415 | 5/1954 | Friedberg ........................ 354/222 |
| 3,648,582 | 3/1972 | Nerwin ............................ 354/219 |
| 4,216,589 | 8/1980 | Beaver .............................. 33/266 |
| 4,764,785 | 8/1988 | Burnham ......................... 354/219 |

FOREIGN PATENT DOCUMENTS 184311 6/1963 Sweden ............................ 354/219

*Primary Examiner*—A. A. Mathews
*Attorney, Agent, or Firm*—Roger A. Fields

[57] ABSTRACT

An open frame sight viewfinder for a photographic camera is disclosed wherein an aiming or target ring of aiming the camera at a subject to be photographed is positioned forward of a correspondingly shaped viewing aperture to view the subject simultaneously through the ring and the aperture. The aiming ring is dimensioned to approximately encircle the extreme rays of ambient light permitted to pass through the viewing aperture. As as a result, when the camera is correctly aimed at the subject, the aiming ring substantially cannot be seen in the viewing aperture. However, when the camera is incorrectly tilted relative to the subject, the aiming ring partially occludes the viewing aperture.

2 Claims, 2 Drawing Sheets

OPEN FRAME SIGHT VIEWFINDER

CROSS-REFERENCE TO A RELATED APPLICATION

Reference is made to commonly assigned copending U.S. application Ser. No. 07/303,619, entitled OPEN FRAME SIGHT VIEWFINDER, and filed Jan. 12, 1989 in the name of William H. Goddard.

BACKGROUND OF THE INVENTION

1. Field of the Invention

The invention relates generally to camera viewfinders, and in particular to an open frame sight viewfinder.

2. Description of the Prior Art

When taking a picture, using a camera, it is necessary to know not only in what direction to aim the camera but also how much of the subject will be included in the picture. For this reason practically every camera has a viewfinder of some kind.

Viewfinders which are built on to or into the camera may be simple framing devices. The frame finder or open frame sight viewfinder is one of the simplest type viewfinders. It often consists of a small peep-sight and larger frame corresponding to the shape and size of the negative. The larger frame is usually positioned forward of the small peep-sight, and they each have a common viewing axis which extends parallel to the optical axis of the taking lens. When the eye is brought close to the aperture of the peep-sight, the view bounded by the frame is almost exactly the same as seen by the taking lens. The only error is that of parallex, which is more or less negligible for subjects beyond about six feet.

Other frame finders, such as disclosed in U.S. Pat. No. 2,005,366, granted June 18, 1935, are in essence gun sights. In this instance, a small ring-shaped sight is positioned forward of a larger rear sight for viewing the small sight within the viewing aperture defined by the larger sight.

The frame finders, unfortunately, in both of the foregoing examples, do not indicate to the photographer when the camera is incorrectly tilted relative to the subject. As a result, the pictures may not turn out as intended.

THE CROSS-REFERENCE APPLICATION

One solution for solving the prior art problem described above in connection with known viewfinders is presented in the cross-referenced application. That application discloses an open frame sight viewfinder for a photographic camera, wherein an aiming ring is positioned forward of a correspondingly shaped viewing aperture. The aiming ring is encircled by a relatively narrow annular zone of light rays, including the extreme rays, which pass through the viewing aperture, and it has an outer diameter which is greater than the viewing diameter of the viewing aperture. Consequently, when the camera is correctly aimed at the subject, the aiming ring appears to be concentrically located within the viewing aperture although separated from the periphery of the viewing aperture by a narrow band of ambient light. However, when the camera is incorrectly tilted relative to the subject, the aiming ring appears distorted within the viewing aperture and quickly eclipses a section of the narrow light band.

SUMMARY OF THE INVENTION

According to the invention, there is provided an improved open frame sight viewfinder for a photographic camera, wherein an aiming sight having an aiming aperture for aiming the camera at a subject to be photographed is positioned forward of a viewing aperture to view the subject simultaneously through the two apertures, and wherein the improvement comprises:

said aiming sight being dimensioned and shaped with respect to said viewing aperture to prevent the aiming sight substantially from being seen in the viewing aperture when the camera is correctly aimed at a subject to be photographed, but allowing the aiming sight to partially occlude the viewing aperture when the camera is incorrectly tilted relative to the subject. Thus, the prior art problem described above in connection with known viewfinders is solved by an improved viewfinder which indicates whether or not the camera is correctly tilted relative to the subject.

DETAILED DESCRIPTION OF THE PREFERRED EMBODIMENT

The invention is disclosed as being embodied preferably in a 35 mm still camera. Because the features of this type of camera are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
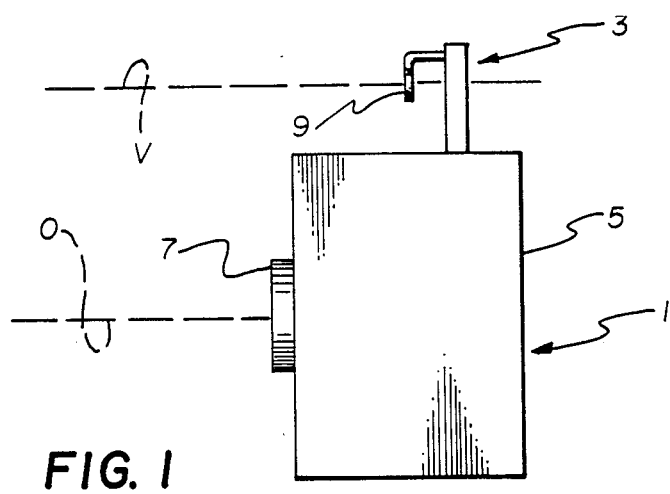
FIG. 1 is a side elevation view of a camera including an improved viewfinder according to a preferred embodiment of the invention.

Referring now to the drawings, FIG. 1 shows a 35mm still camera 1 including an open frame sight viewfinder 3 according to a preferred embodiment of the invention. The viewfinder 3 is pivotally mounted on top of the camera body 5 for movement between the illustrated erect position and a folded or flat position, not shown, against the camera body. When the viewfinder 3 is in the erect position, its viewing axis V extends parallel to the optical axis O of the camera lens 7.

Figure 2:
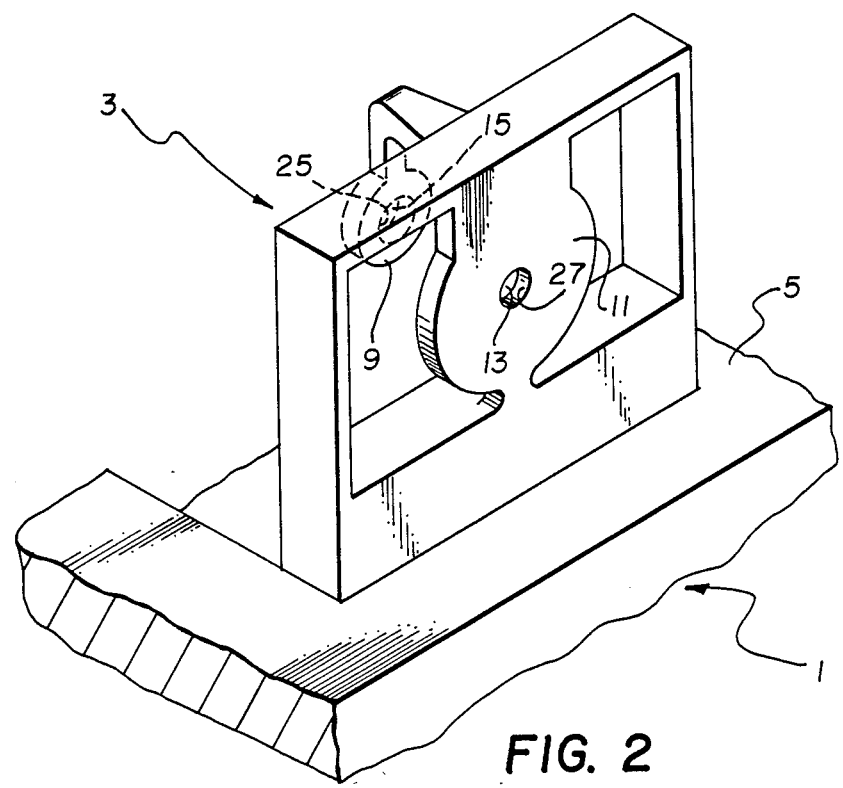
FIG. 2 is a rear perspective view of the improved viewfinder.
Figure 3:
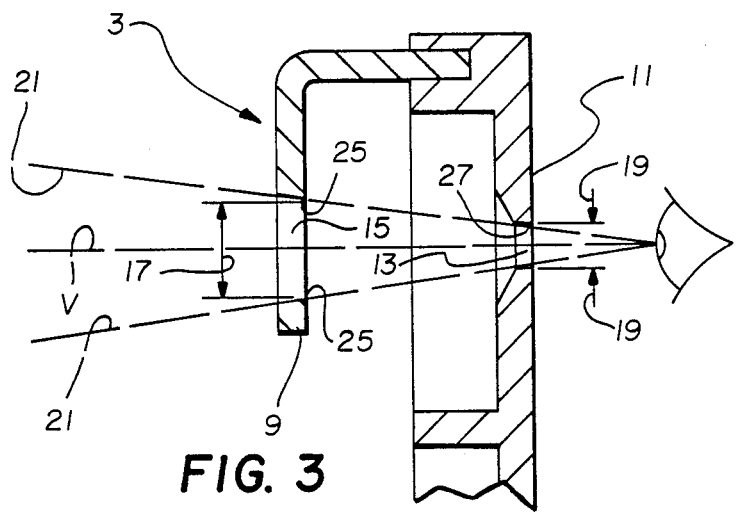
FIG. 3 is a side sectional view of the improved viewfinder, showing the ray path of ambient light to the eye.
Figure 4:
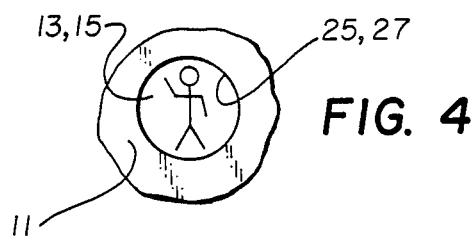
FIG. 4 is a rear elevation view of the improved viewfinder, indicating the eye view through the viewfinder when the camera is correctly tilted relative to the subject.
Figure 5A:
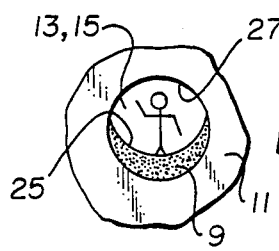
FIGS. 5a, 5b, 5c, and 5d are rear elevation views similar to FIG. 4, indicating the respective eye views through the viewfinder when the camera is incorrectly tilted down, up, right, and left relative to the subject.
Figure 5B:
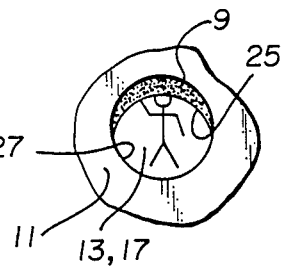
Figure 5C:
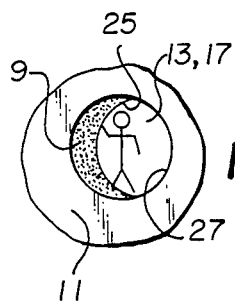
Figure 5D:
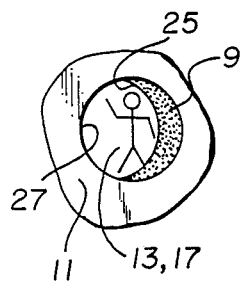

As shown in FIGS. 2 and 3, the viewfinder 3 comprises a small aiming or target ring 9 positioned forward of a rear eye-sight 11 having a central viewing aperture 13. The central viewing aperture 13 of the eye-sight 11 and a central aiming aperture 15 of the aiming ring 9 are each centered about the viewing axis V to view the subject simultaneously through the two apertures. See FIG. 4.

The aiming aperture 15 of the aiming ring 9 has a minor or lesser diameter 17 which is dimensioned relative to a minor or lesser diameter 19 of the viewing aperture 13 of the eye-sight 11 to encircle the extreme rays 21 of ambient light permitted to pass through the viewing aperture. See FIG. 3. The minor or lesser diameter 17 and the minor or lessor diameter 19 are measured from the respective peripheries 25 and 27 of the aiming aperture 15 and the viewing aperture 13, and in particular from the individual points at which the two diameters are the smallest. Thus, the two diameters 17 and 19 are referred to as "minor" or "lesser" diameters.

OPERATION

When the camera lens 7 is correctly aimed at the subject, the aiming ring 9 substantially cannot be seen in the viewing aperture 13. See FIG. 4. However, when the camera lens 7 is incorrectly tilted down, up, right, or left relative to the subject, the aiming ring 9 partially occludes the viewing aperture 13 in a non-concentric manner. See FIGS. 5a, 5b, 5c, and 5d, respectively.

The invention has been described with reference to a preferred embodiment. However, it will be appreciated that variations and modifications can be effected within the ordinary skill in the art without departing from the scope of the invention. For example, in FIG. 3, should the eye be moved closer to the viewing aperture 13, the field of vision or angle of view through the viewing aperture would be slightly increased, i.e. widened. In this instance, the minor or lesser diameter 17 of the aiming aperture 15 might not be great enough to allow the aiming aperture to include the extreme rays 23. As a result, a very small annular portion of the aiming ring 9 might be visible in the viewing aperture 13 when the camera lens 7 is correctly aimed at the subject. The visible portion of the aiming ring 9 would appear to lie against the periphery 27 of the viewing aperture 13.

I claim:

1. An improved open frame sight viewfinder for a photographic camera, wherein an aiming sight having a circular-shaped aiming aperture for aiming the camera at a subject to be photographed is positioned forward of a similarly shaped viewing aperture to view the subject simultaneously through the two apertures, and wherein the improvement comprises:

said aiming aperture being dimensioned sufficiently greater than said viewing aperture to approximately encircle the extreme rays of ambient light permitted to pass through the viewing aperture, to prevent said aiming sight substantially from being seen in the viewing aperture when the camera is correctly aimed at a subject to be photographed, but causing the aiming sight to partially occlude the viewing aperture when the camera is incorrectly tilted relative to the subject.

2. An improved open frame sight viewfinder for a photographic camera, wherein an aiming ring for aiming the camera at a subject to be phototgraphed is positioned forward of a correspondingly shaped viewing aperture to view the subject simultaneously through said ring and said aperture, and wherein the improvement comprises:

said aiming ring having an aiming aperture dimensioned sufficiently greater than said viewing aperture to approximately encircle the extreme rays of ambient light permitted to pass through the viewing aperture, to prevent the aiming ring substantially from being seen in the viewing aperture when the camera is correctly aimed at a subject to be photographed, but causing the aiming ring to partially occlude the viewing aperture when the camera is incorrectly tilted relative to the subject.

* * * * *